US012472392B2

(12) United States Patent
Park

(10) Patent No.: US 12,472,392 B2
(45) Date of Patent: Nov. 18, 2025

(54) FIRE SHUTTER CONTROL SYSTEM AND FIRE SHUTTER CONTROL METHOD

(71) Applicant: SEMES CO., LTD., Chungcheongnam-do (KR)

(72) Inventor: Jae Bong Park, Chungcheongnam-do (KR)

(73) Assignee: SEMES CO., LTD., Chungcheongnam-Do (KR)

( * ) Notice: Subject to any disclaimer, the term of this patent is extended or adjusted under 35 U.S.C. 154(b) by 391 days.

(21) Appl. No.: 18/187,083

(22) Filed: Mar. 21, 2023

(65) Prior Publication Data

US 2023/0364454 A1 Nov. 16, 2023

(30) Foreign Application Priority Data

May 11, 2022 (KR) ........................ 10-2022-0057759

(51) Int. Cl.

| | |
|---|---|
| ***E06B 9/11*** | (2006.01) |
| ***A62C 2/24*** | (2006.01) |
| ***A62C 37/36*** | (2006.01) |
| ***A62C 37/44*** | (2006.01) |
| *E06B 9/68* | (2006.01) |

(52) U.S. Cl.

CPC .............. *A62C 2/247* (2013.01); *A62C 37/04* (2013.01); *A62C 37/44* (2013.01); *E06B 9/11* (2013.01); *E05Y 2400/612* (2013.01); *E06B 2009/6818* (2013.01); *E06B 2009/6845* (2013.01)

(58) Field of Classification Search

None

See application file for complete search history.

(56) References Cited

U.S. PATENT DOCUMENTS 5,355,927 A * 10/1994 McKeon ................. E05F 15/72 160/310
2007/0272367 A1* 11/2007 Gomaa ............... E06B 9/17046 160/116

(Continued)

FOREIGN PATENT DOCUMENTS

CN 117052269 A * 11/2023 ............. A62C 2/247
JP H03-059288 A 3/1991

(Continued)

OTHER PUBLICATIONS

Korean Office Action issued in corresponding KR Patent Application No. 10-2022-0057759, dated May 22, 2024, with English translation.

*Primary Examiner* — Phi D A

(74) *Attorney, Agent, or Firm* — Carter, DeLuca & Farrell LLP

(57) ABSTRACT

A fire shutter control system and a fire shutter control method capable of effectively controlling a fire shutter in the event of a fire in a building are provided. The fire shutter control system may include a fire detector configured to detect a fire outbreak and generate a fire signal in the event of a fire; a fire shutter controller configured to apply a control signal to a fire shutter to enable a drive motor for operating the fire shutter to operate when the fire signal is generated by the fire detector; and a power supply unit configured to supply power to the fire detector, the fire shutter controller, and the drive motor for operating the fire shutter.

16 Claims, 6 Drawing Sheets

(56) References Cited

U.S. PATENT DOCUMENTS

| | | | | |
|---|---|---|---|---|
| 2009/0071082 | A1* | 3/2009 | Van Der Kort | E06B 9/11 52/741.3 |
| 2015/0035440 | A1* | 2/2015 | Spero | F21S 41/143 315/153 |
| 2015/0187209 | A1* | 7/2015 | Brandt | H04L 65/70 340/12.22 |
| 2016/0338167 | A1* | 11/2016 | Steiner | H05B 31/50 |
| 2018/0212792 | A1* | 7/2018 | Brandt | H04L 65/70 |

FOREIGN PATENT DOCUMENTS

| | | | | |
|---|---|---|---|---|
| JP | 2007-224628 | A | 9/2007 | |
| JP | 2018-206013 | A | 12/2018 | |
| JP | 6825994 | B2 * | 2/2021 | |
| KR | 970005696 | B1 * | 4/1997 | A62C 2/247 |
| KR | 10-1999-0069254 | A | 9/1999 | |
| KR | 10-0269768 | B1 | 3/2001 | |
| KR | 20-0434641 | Y1 | 12/2006 | |
| KR | 10-0762422 | B1 | 10/2007 | |
| KR | 10-2019-0119848 | A | 10/2019 | |

* cited by examiner

FIRE SHUTTER CONTROL SYSTEM AND FIRE SHUTTER CONTROL METHOD

CROSS-REFERENCE TO RELATED APPLICATION(S)

This application claims the benefit under 35 USC § 119(a) of Korean Patent Application No. 10-2022-0057759, filed on May 11, 2022, in the Korean Intellectual Property Office, the entire disclosure of which is incorporated herein by reference for all purposes.

BACKGROUND

1. Field

The following description relates to a fire shutter control system and a fire shutter control method, and more particularly, to a fire shutter control system and a fire shutter control method capable of effectively controlling a fire shutter in the event of a fire in a building.

2. Description of Related Art

Generally, a manufacturing line of a semiconductor or display manufacturing plant may include clean rooms of multiple floors, and facilities for performing processes, such as deposition, exposing, etching, ion-implantation, cleaning, etc., may be disposed on each floor. A semiconductor device or a display device may be manufactured by repeatedly performing a series of unit processes on a glass substrate used as a semiconductor wafer or a display substrate.

Generally, materials such as semiconductor wafers or glass substrates may be transported in a vertical direction between clean rooms of multiple floors by a tower lift. Each of the floors is provided with an elevating passage of the tower lift, and a fire shutter may be provided on the elevating passage to block flames and smoke in the event of a fire.

The fire shutter may be opened or closed by a driving unit such as a motor. However, when the power is cut off, or when a programmable logic controller (PLC) configured to control the driving of the fire shutter is damaged or malfunctioned by a fire, the fire shutter may not operate normally even in the event of a fire. As such, when the fire shutter does not operate normally due to a power failure or damage to some control devices in the event of a fire, fire-produced toxic gases may be transferred to all floors, and the fire may spread throughout the building, which may further increase fire damage.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a fire shutter control system and a fire shutter control method capable of normally operating a fire shutter even if a power failure or damage to some control devices occurs in the event of a fire.

According to an exemplary embodiment, there is provided a fire shutter control system. The fire shutter control system may include a fire detector configured to detect a fire outbreak and generate a fire signal in the event of a fire; a fire shutter controller configured to apply a control signal to a fire shutter to enable a drive motor for operating the fire shutter to operate when the fire signal is generated by the fire detector; and a power supply unit configured to supply power to the fire detector, the fire shutter controller, and the drive motor for operating the fire shutter, wherein the fire shutter controller may include a dual signal generation system configured to dually apply the control signal to the fire shutter to prevent failure of operation control of the fire shutter and the power supply unit may include a dual power supply system configured to supply emergency power to the fire detector, the fire shutter controller, and the drive motor for operating the fire shutter when main power is cut off so that the power can be supplied even in the event of a power failure.

According to an exemplary embodiment of the present invention, the fire detector may include a fire signal generator electrically connected to at least one of a smoke sensor for detecting an occurrence of smoke in a specific area or a heat sensor for detecting flames and configured to generate the fire signal related to the smoke or heat in the event of a fire; and a disaster prevention center configured to transmit the fire signal to the fire shutter controller corresponding to the specific area when the fire signal is generated by the fire signal generator.

According to an exemplary embodiment of the present invention, when the fire signal is generated by the fire detector, the fire shutter controller may apply a first control signal to the fire shutter to enable the drive motor for operating the fire shutter to operate, and apply a second control signal to the fire shutter after the lapse of a first time period.

According to an exemplary embodiment of the present invention, the fire shutter controller may include a programmable logic controller (PLC) configured to apply the first control signal to the fire shutter when the fire signal is generated by the fire detector; and a timer configured to apply the second control signal to the fire shutter after the lapse of the first time period when the fire signal is generated by the fire detector.

According to an exemplary embodiment of the present invention, the fire shutter controller may further include a relay configured to receive the first control signal from the PLC or the second control signal from the timer and transmit a close signal to the fire shutter.

According to an exemplary embodiment of the present invention, the fire shutter controller may further include a limit sensor installed on one side of a slat of the fire shutter to sense completion of descent of the slat.

According to an exemplary embodiment of the present invention, the limit sensor may apply a descent completion signal to the PLC when sensing the completion of the descent of the slat and the PLC may determine that closing of the fire shutter is completed when receiving the descent completion signal from the limit sensor, and transmit a closing completion signal to the disaster prevention center of the fire detector.

According to an exemplary embodiment of the present invention, the disaster prevention center may transmit again the fire signal to the fire shutter controller corresponding to the specific area if the closing completion signal is not applied from the PLC even after the lapse of a second time period.

According to an exemplary embodiment of the present invention, the power supply unit may include a main power supply source configured to receive external power from an external power source and supply the main power to the fire detector, the fire shutter controller, and the drive motor for operating the fire shutter; and an emergency power supply source electrically connected to the main power supply source and configured to receive at least a portion of the main power from the main power supply source, store emergency electric power, and supply the stored electric power as the emergency power to the fire detector, the fire shutter controller, and the drive motor for operating the fire shutter when the external power is cut off.

According to an exemplary embodiment of the present invention, the emergency power supply source may include a battery configured to store the emergency electric power; and a charger configured to receive at least a portion of the main power from a switched-mode power supply (SMPS) of the main power supply source and charge the battery.

According to an exemplary embodiment of the present invention, the main power supply source may include a first voltmeter configured to measure a voltage of the main power, the emergency power supply source may include a second voltmeter, and when the voltage of the main power measured by the first voltmeter is measured to be less than or equal to a predetermined voltage, the power supply unit may determine that the external power is cut off, and disconnect between a terminal block and the main power supply source by turning off a first magnetic contactor (MC) of the main power supply source and connect between the terminal block and the emergency power supply source by turning on a second magnetic contactor of the emergency power supply source so that the emergency electric power stored in the battery can be supplied as the emergency power.

According to an exemplary embodiment of the present invention, the fire shutter control system may further include a terminal block configured to electrically connect the power supply unit, the fire detector, the fire shutter controller, and the drive motor for operating the fire shutter.

According to an exemplary embodiment of the present invention, the fire shutter control system may further include a monitor unit electrically connected to the fire detector and configured to display a fire situation, and a state of operating the fire shutter by the fire shutter controller.

According to another general aspect, there is provided a fire shutter control method. The fire shutter control method may include: a fire detection operation of detecting, by a fire detector, a fire outbreak and generating a fire signal in the event of a fire; and a fire shutter control operation of controlling a fire shutter by a fire shutter controller to enable a drive motor for operating the fire shutter to operate when the fire signal is generated in the fire detection operation, wherein in the fire shutter control operation, the control signal may be dually applied to the fire shutter to prevent failure of operation control of the fire shutter.

According to another exemplary embodiment of the present invention, the fire shutter control operation may include a first control operation of applying a first control signal to the fire shutter to operate the fire shutter; and a second control operation of applying a second control signal to the fire shutter when a first time period elapses after performing the first control operation.

According to another exemplary embodiment of the present invention, the fire shutter control operation may include a shutter closing detection operation of detecting a descent completion of a slat of the fire shutter through a limit sensor installed on one side of the slat.

According to another exemplary embodiment of the present invention, in the shutter closing detection operation of the fire shutter control operation, when a descent completion signal is applied, it may be determined that closing of the fire shutter is completed and a closing completion signal may be transmitted to a disaster prevention center of the fire detector.

According to anther exemplary embodiment of the present invention, in the fire shutter control operation, if the descent completion signal is not applied through the shutter closing detection operation even after the lapse of a second time period, at least one of the first control operation or the second control operation may be re-performed.

According to another exemplary embodiment of the present invention, in the fire detection operation and the fire shutter control operation, the fire detector, the fire shutter controller, and the drive motor for operating the fire shutter may be supplied with power from a power supply unit and the power supply unit may include a dual power supply system configured to supply emergency power to the fire detector, the fire shutter controller, and the drive motor for operating the fire shutter when main power is cut off, so that the power can be supplied in the event of a power failure.

According to still another exemplary embodiment of the present invention, there is provided a fire shutter control system. The fire shutter control system may include: a fire detector configured to detect a fire outbreak and generate a fire signal in the event of a fire; a fire shutter controller configured to apply a control signal to a fire shutter to enable a drive motor for operating the fire shutter to operate when the fire signal is generated by the fire detector and including a dual signal generation system configured to dually apply the control signal to the fire shutter to prevent failure of control operation of the fire shutter; and a power supply unit configured to supply power to the fire detector, the fire shutter controller, and the drive motor for operating the fire shutter and including a dual power supply system configured to supply emergency power to the fire detector, the fire shutter controller, and the drive motor for operating the fire shutter when main power is cut off so that the power can be supplied in the event of a power failure, wherein the fire detector may include a fire signal generator electrically connected to at least one of a smoke sensor for detecting an occurrence of smoke in a specific area or a heat sensor for detecting flames and configured to generate the fire signal related to the smoke or heat in the event of a fire; and a disaster prevention center configured to transmit the fire signal to the fire shutter controller corresponding to the specific area when the fire signal is generated by the signal generator, the fire shutter controller may include a PLC configured to apply a first control signal to the fire shutter; and a timer configured to apply a second control signal to the fire shutter after the lapse of a first time period, so that the fire shutter can be operated by applying the first control signal to the fire shutter and applying the second control signal to the fire shutter after the lapse of the first time period when the fire signal is generated by the fire signal generator, and the power supply unit may include a main power supply source configured to receive external power from an external power source and supply the main power to the fire detector, the fire shutter controller, and the drive motor for operating the fire shutter; and an emergency power supply source electrically connected to the main power supply source and configured to receive at least a portion of the main power from the main power supply source, store emergency electric power, and supply the stored electric power as the emergency power to the fire detector, the fire shutter controller, and the drive motor for operating the fire shutter when the external power is cut off.

Other features and aspects will be apparent from the following detailed description, the drawings, and the claims.

Figure 1:
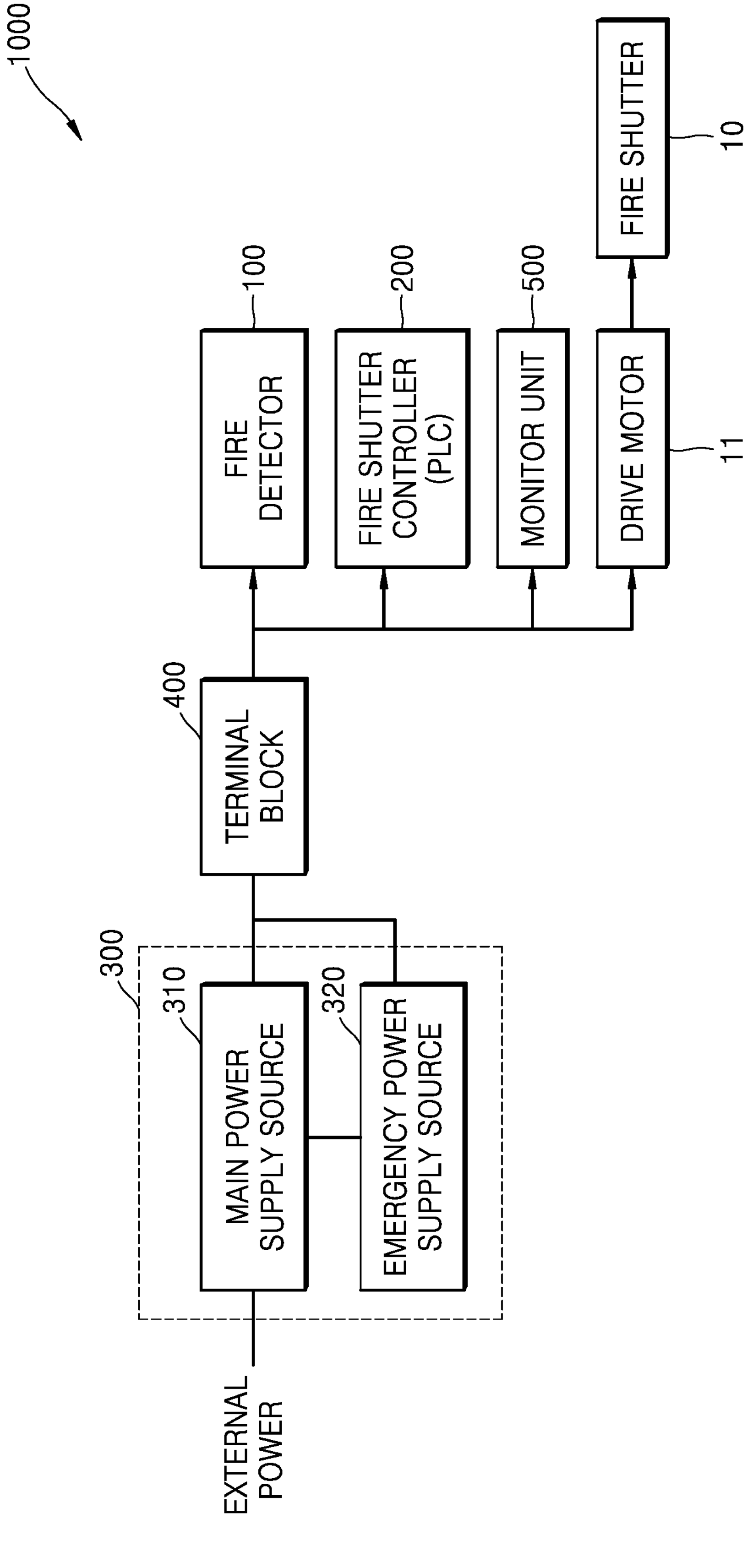
FIG. 1 is a block diagram schematically illustrating a configuration of a fire shutter control system according to an exemplary embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, various preferred embodiments of the present invention will be described in detail with reference to the accompanying drawings.

The embodiments of the present invention are provided for more fully describing the present invention to those skilled in the art, and the embodiments below may be modified in various forms, and the scope of the present invention is not limited to the embodiments below. Rather, these embodiments are provided such that this disclosure will be thorough and complete and will fully convey the spirit of the present invention to those skilled in the art. Also, thickness or sizes of layers in the drawings are exaggerated for convenience of explanation and clarity.

Hereinafter, the embodiments of the present invention are described in detail with reference to the accompanying drawings. In the drawings, the illustrated shapes may be modified according to, for example, manufacturing technology and/or tolerance. Thus, the embodiment of the present invention may not be construed to be limited to a particular shape of a part described in the present specification and may include a change in the shape generated during manufacturing, for example.

Figure 2:
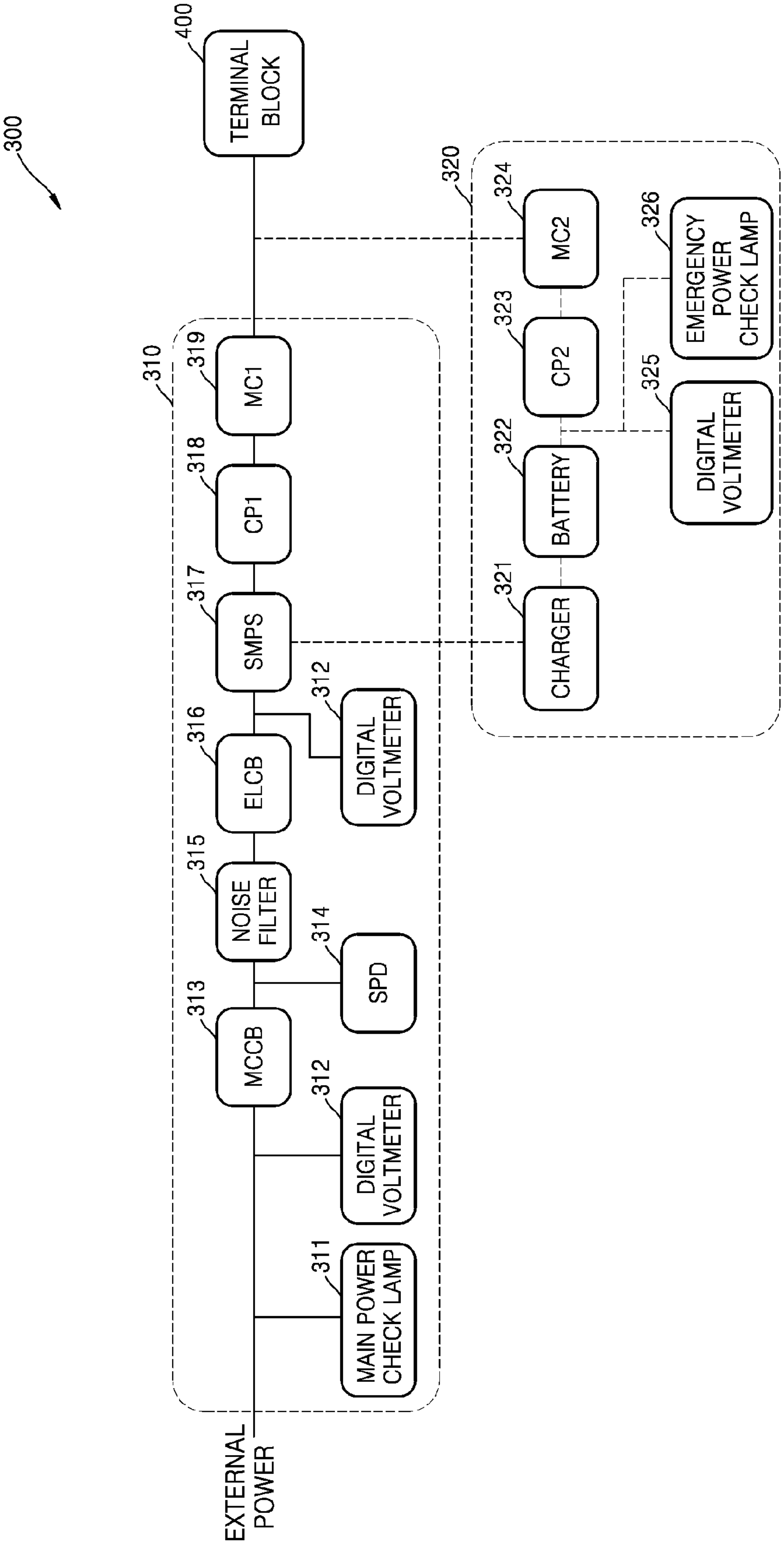
FIG. 2 is a block diagram schematically illustrating a configuration of a power supply unit of the fire shutter control system of FIG. 1.
Figure 3:
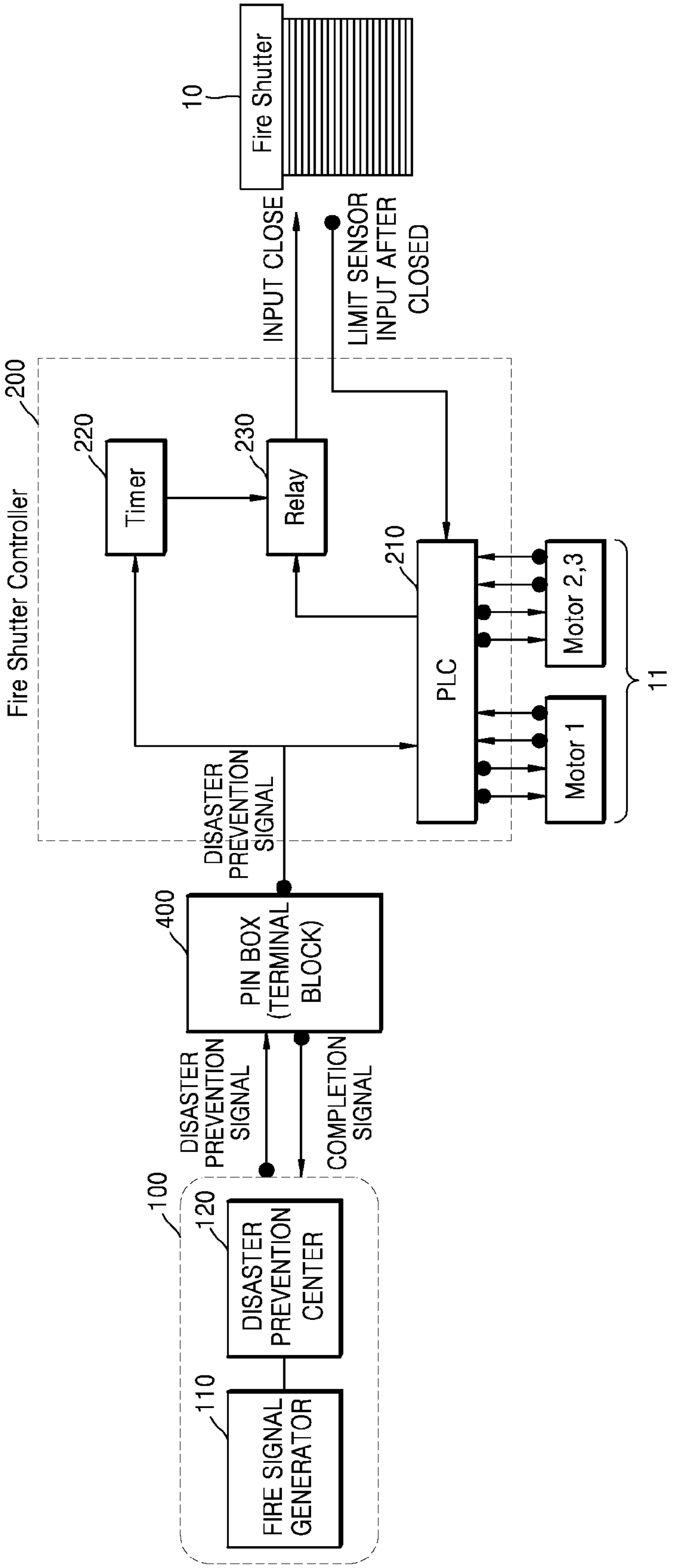
FIG. 3 is a block diagram schematically illustrating a configuration of a fire detection unit and a shutter control unit of the fire shutter control system of FIG. 1.
Figure 4:
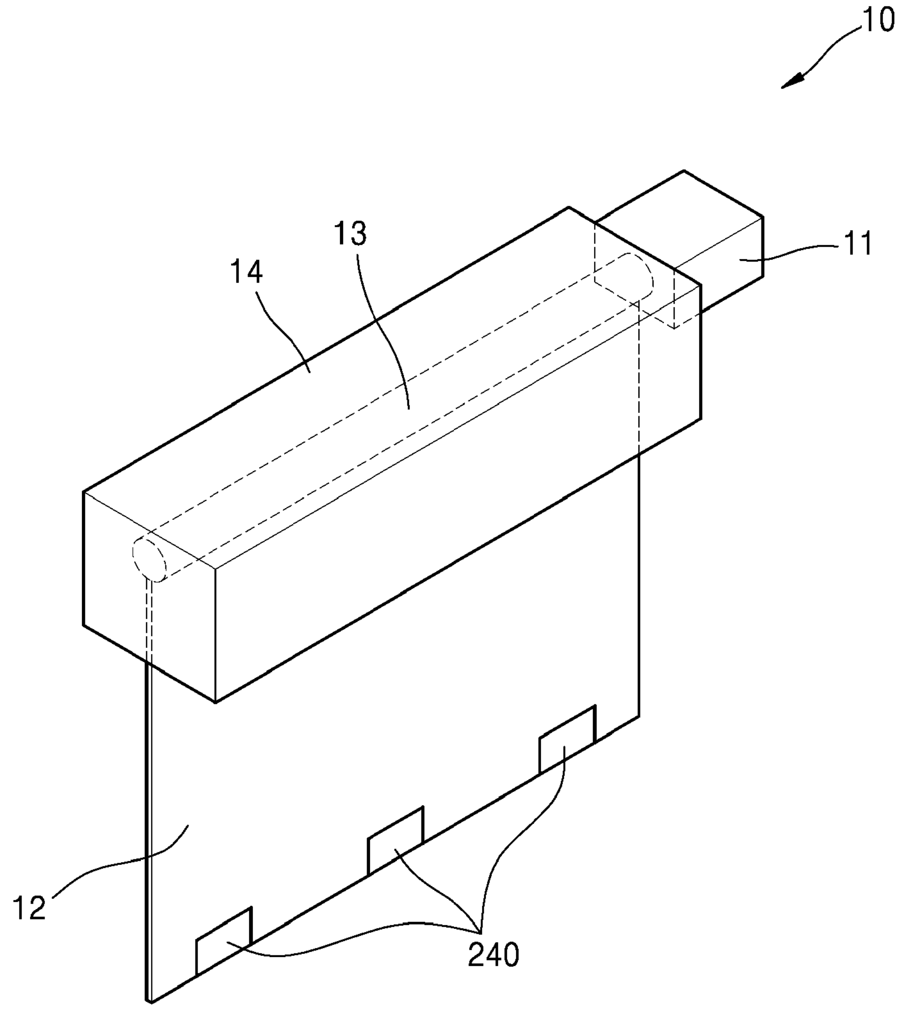
FIG. 4 is a perspective view schematically showing a fire shutter operated under the control of the shutter control unit of FIG. 3.

FIG. 1 is a block diagram schematically illustrating a configuration of a fire shutter control system 1000 according to an exemplary embodiment of the present invention, and FIG. 2 is a block diagram schematically illustrating a configuration of a power supply unit 300 of the fire shutter control system 1000 of FIG. 1. FIG. 3 is a block diagram schematically illustrating a configuration of a fire detector 100 and a shutter control unit 200 of the fire shutter control system 1000 of FIG. 1, and FIG. 4 is a perspective view schematically showing a fire shutter 10 operated under the control of the fire shutter controller 200 of FIG. 3.

As shown in FIG. 1, the fire shutter control system 1000 according to an exemplary embodiment of the present invention may mainly include a fire detector 100, a fire shutter controller 200, a power supply unit 300, a terminal block 400, and a monitor unit 500.

As shown in FIGS. 1 and 2, the power supply unit 300 may supply power to the fire detector 100, the fire shutter controller 200, and a drive motor 11 for operating the fire shutter 10, which will be described below.

For example, the power supply unit 300 may supply power through the terminal block 400 that electrically connects the power supply unit 300, the fire detector 100, the fire shutter control unit 200, and the drive motor 11 for operating the fire shutter 10.

Here, the terminal block 400, which is a kind of terminal having one or more electrical connectors, may be provided in a form accommodated in a terminal box made of an aluminum material or a plastic material. The terminal block 400 may electrically connect the above-described components to one another, and may serve to transmit an electrical control signal between each component, in addition to distributing power supply supplied from the power supply unit 300.

In addition, the power supply unit 300 may include a dual power supply system configured to supply emergency power to the fire detector 100, the fire shutter controller 200, and the drive motor 11 for operating the fire shutter 10 when the main power is cut off, so that power can be supplied in the event of a power failure.

For example, as shown in FIGS. 1 and 2, the power supply unit 300 may be mainly composed of a main power supply source 310 and an emergency power supply source 320.

The main power supply source 310 may receive external power from an external power source and supply main power to the fire detector 100, the fire shutter controller 200, and the drive motor 11 for operating the fire shutter 10.

More specifically, as shown in FIG. 2, the main power supply source 310 may be configured to include a molded case circuit breaker (MCCB) 313 configured to detect an abnormal current and cut off a main line before it is burned or damaged by heat, a noise filter 315 configured to reduce noise components included in the main line, an earth leakage circuit breaker (ELCB) 316 configured to cut off the main line in the event of a short circuit, an earth leakage current, or overload on the main line, a switched-mode power supply (SMPS) 317 configured to receive alternating current (AC) power of the main line, convert the characteristics of the received AC power into direct current (DC) power, and supply DC power to another electronic device, a circuit protector (CP) 318 configured to cut off current to protect a device when overcurrent flows in the main line, and a magnetic contactor (MC) 319 configured to turn on/off between the main line and the terminal block 400 by opening and closing a contact point by the operation of an electromagnet.

In addition, the main power supply source 310 may further include a main power check lamp 311 configured to check whether power is supplied to the main line, a first voltmeter 312 connected to at least one point of the main line to measure a voltage of the main line, and a surge protective device (SPD) 314 configured to protect the main line from surges to prevent damage to power equipment from lightning strike voltage.

The arrangement of the electric power facilities of the main power supply source 310 is not necessarily limited to that shown in FIG. 2 and may be arranged in a variety of forms depending on the specifications of the device or the field of application.

In addition, the emergency power supply source 320 may be electrically connected to the main power supply source 310 to receive at least a portion of the main power from the main power supply source 310 and store emergency electric power when the external power is supplied, and when the external power is cut off, may supply the stored emergency electric power as emergency power to the fire detector 100, the fire shutter controller 200, and the drive motor 11 for operating the fire shutter 10 through the terminal block 400.

More specifically, as shown in FIG. 2, the emergency power supply source 320 may be configured to include a battery 322 configured to store emergency power, a charger 321 configured to charge the battery 322 by selectively receiving at least a portion of the main power from the switching-mode power supply 317 of the main power supply source 310, a circuit protection breaker 323 configured to cut off current to protect a device when overcurrent flows in an emergency line, and a second magnetic contactor 324 configured to turn on/off between the emergency line and the terminal block 400 by opening and closing a contact point by the operation of an electromagnet.

In addition, the emergency power supply source 320 may further include a second voltmeter 325 connected to at least one point of the emergency line to measure a voltage of the emergency line and an emergency power check lamp 326 configured to check whether power is supplied to the emergency line.

The arrangement of the power facilities of the emergency power supply source 310 is not necessarily limited to that shown in FIG. 2 and may be arranged in a variety of forms depending on the specifications of the device or the field of application.

Therefore, the power supply unit 300 is configured as a dual power supply system consisting of the main power supply source 310 and the emergency power supply source 320, so that even if the external power is not supplied to the main power supply source 310 in the event of a power failure, power can be easily supplied through the emergency power supply source 320.

For example, when the voltage of the main power measured by the first voltmeter 312 of the main power supply source 310 is measured to be less than or equal to a predetermined voltage, the power supply unit 300 may determine that the external power is cut off, and cut off between the terminal block 400 and the main power supply source 310 by turning off the first magnetic contactor 319 and connect between the terminal block 400 and the emergency power supply source 320 by turning on the second magnetic contactor 324 of the emergency power supply source 320 so that the emergency electric power stored in the battery 322 of the emergency power supply source 320 can be supplied as the emergency power, thereby easily supplying power through the emergency power supply source 320 even when the external power is not supplied to the main power supply source 310.

As shown in FIG. 3, the fire detector 100 may detect a fire outbreak and generate a fire signal when a fire breaks out.

For example, the fire detector 100 may include a fire signal generator 110 electrically connected to at least one of a smoke sensor for detecting an occurrence of smoke in a specific area or a heat sensor for detecting flames and configured to generate a fire signal related to the smoke or heat in the event of a fire and a disaster prevention center 120 configured to transmit the fire signal to the fire shutter controller 200 corresponding to the specific area when the fire signal is generated by the signal generator 110.

In this exemplary embodiment, one fire signal generator 110 and one fire shutter controller 200 to be described below are illustrated, but the present invention is not necessarily limited thereto, such that a plurality of fire signal generators 110 and a plurality of fire shutter controllers 200 may be installed at various points in a building where the semiconductor process is performed. In this case, when a fire signal is generated by any one of the fire signal generators 110, the disaster prevention center 120 may locate the corresponding fire signal generator 110 and transmit the fire signal to the fire shutter controller 200 that controls the fire shutter 10 placed at the corresponding location.

In addition, when the fire signal is generated by the fire detector 100, the fire shutter controller 200 may apply a control signal to the fire shutter 10 to enable the drive motor 11 for operating the fire shutter 10 to operate.

At this time, the fire shutter controller 200 may be configured as a dual signal generation system configured to dually apply control signals to the fire shutter 10 to prevent failure of the operation control of the fire shutter 10.

More specifically, the fire shutter controller 200 may be configured to include a programmable logic controller (PLC) 210 configured to apply a first control signal to the fire shutter 10 through the terminal block 400 when the fire signal is generated by the fire detector 100, a timer 220 configured to apply a second control signal to the fire shutter 10 after the lapse of a first time period when the fire signal is generated by the fire detector 100, and a relay 230 configured to receive the first control signal from the PLC 210 or the second control signal from the timer 220 and transmit a close signal to the fire shutter 10.

Accordingly, the fire shutter controller 200 may be configured as a dual signal generation system which is dually connected to the PLC and the timer and transmits dual disaster prevention signals to operate the fire shutter 10 by applying the first control signal to the fire shutter 10 from the PLC 210 through the relay and applying the second control signal to the fire shutter 20 from the timer 220 through the relay after the lapse of the first time period, when the fire signal is generated by the fire detector 100. Here, the first time period which is an interval for dually transmitting the disaster prevention signals may be variously set by a manager to a proper time period.

In addition, the fire shutter controller 200 may receive a feedback signal regarding the completion of the closing of the fire shutter from the fire shutter 10.

For example, as shown in FIG. 4, the fire shutter 10 controlled by the fire shutter controller 200 may be made of a material having fireproof performance and may include a slat 12. The slat 12 may be usually wound around a shaft 13 and stored inside a shutter box 14, and in the event of a fire, may be released from the shaft 13 rotated by driving the drive motor 11 and descend to the ground to prevent flame or smoke from spreading. The fire shutter controller 200 may further include a limit sensor 240 installed on one side of the slat 12 of the fire shutter 10 and configured to sense the contact with the ground to detect the completion of the descent of the slat 12.

Accordingly, the limit sensor 240 may apply a descent completion signal to the PLC 210 when detecting the completion of the descent of the slat 12 of the fire shutter 10. Upon receiving the descent completion signal from the limit sensor 240, the PLC 210 may determine that the closing of the fire shutter 10 is completed, stop the driving of the drive motor 11, and apply a closing completion signal to the disaster prevention center 120 of the fire detector 100 through the terminal block 400.

In this case, if the closing completion signal is not applied from the PLC 210 even after the lapse of a second time period, the disaster prevention center 120 may determine that the control of the fire shutter 10 is not normally operated, display a warning signal to the manager through the monitor unit 500, which is electrically connected to the fire detector 100 through the terminal block 400 to display a fire situation and an operating state of the fire shutter 10, and transmit again the fire signal to the shutter controller 200 that corresponds to the specific area where a fire breaks out.

Here, the second time period may be various set by the manager to an arbitrary time period, in consideration of the first time period, which is an interval for dually transmitting the disaster prevention signals, and an operating time period for which the closing operation of the fire shutter 10 can be normally completed.

Therefore, according to the fire shutter control system 1000 in accordance with various embodiments of the present invention, it is possible to configure a dual power supply system that uses an emergency power source consisting of a charger and a battery in addition to a general power source to supply power in the event of a power failure and to configure a dual signal generation system that dually transmits disaster prevention signals by being dually connected to a PLC and a timer so that a normal operation is enabled even in the event of a PLC failure.

In this way, in normal circumstances, the fire shutter 10 may be operated with a general power system, but in an emergency, such as in the event of a fire or a power failure, the fire shutter 10 may be stably operated by using dually provided emergency power source and disaster prevention signals, so that the fire shutter 10 can be normally operated even in the event of a power failure or damage to some control devices.

Thus, in the event of a fire, even when a power failure or damage to some control devices occurs due to a fire, the fire shutter may be normally operated to prevent fire-produced toxic gases from being transported to all floors and to prevent the fire from spreading throughout all floors, thereby minimizing damage caused by fire.

Hereinafter, a fire prevention shutter control method using the fire prevention shutter control system 1000 described above will be described in detail.

Figure 5:
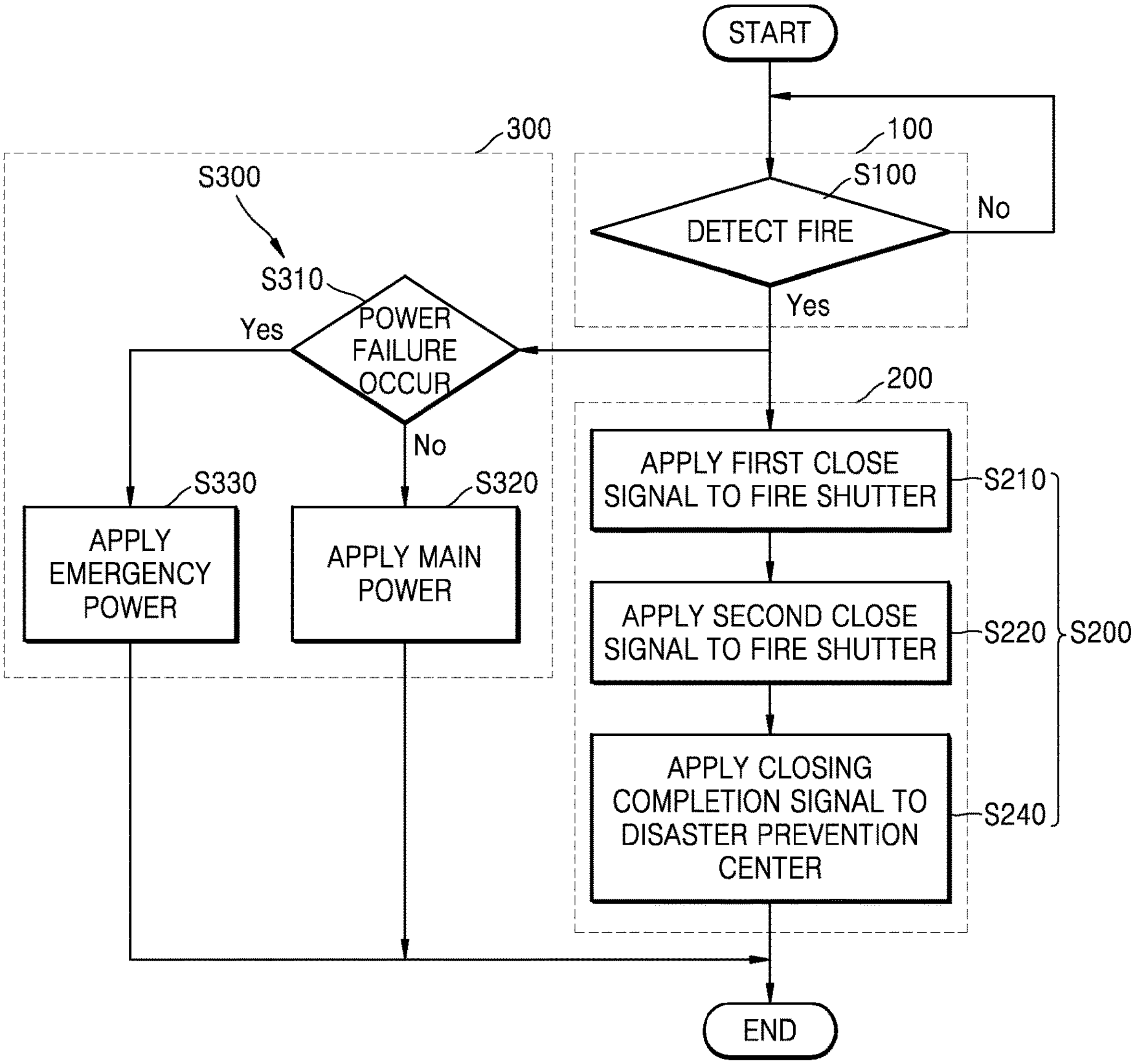
FIG. 5 is a flowchart illustrating a fire shutter control method according to another exemplary embodiment of the present invention.
Figure 6:
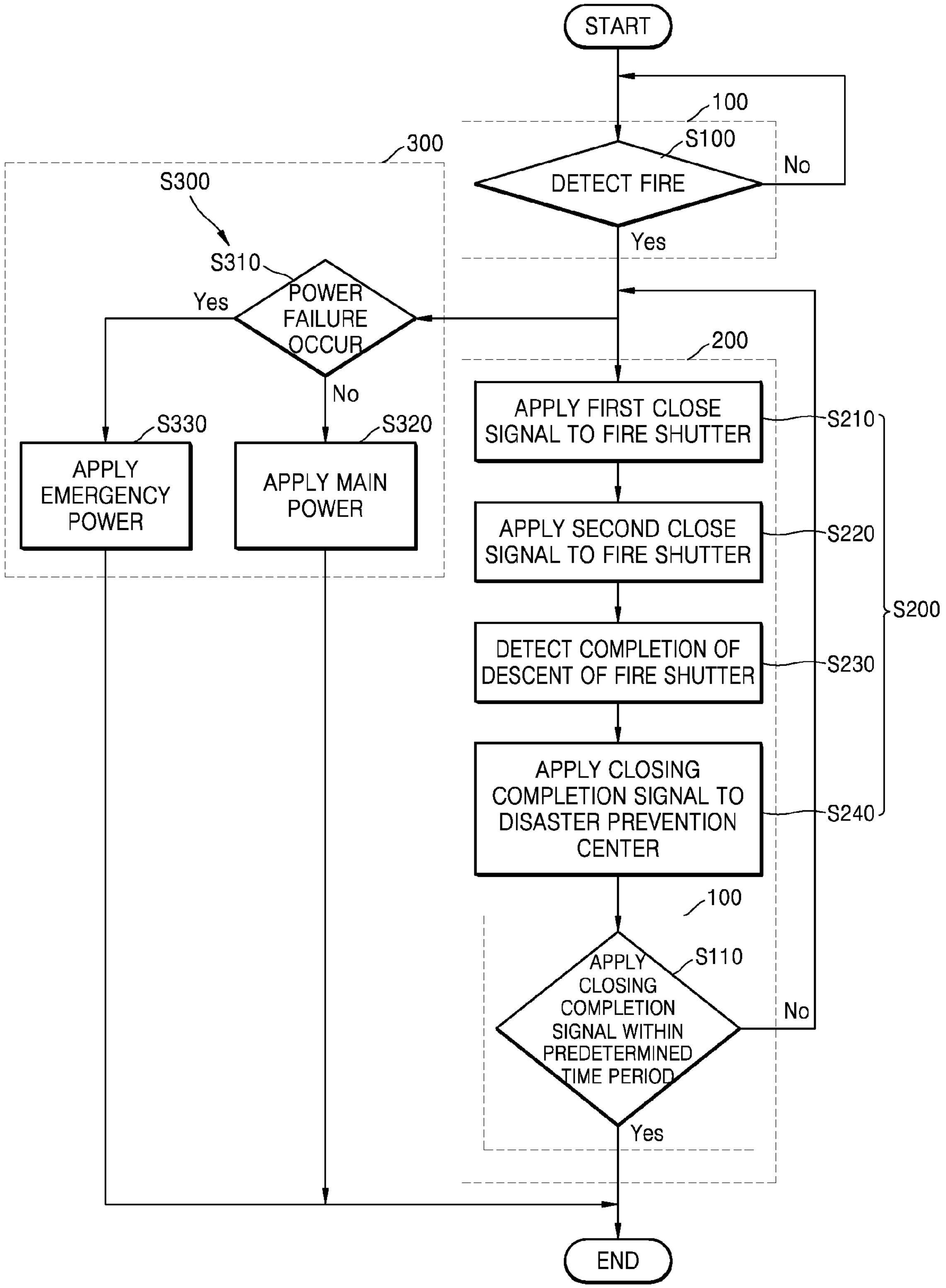
FIG. 6 is a flowchart illustrating a fire shutter control method according to still another exemplary embodiment of the present invention.

FIG. 5 is a flowchart illustrating a fire shutter control method according to another exemplary embodiment of the present invention, and FIG. 6 is a flowchart illustrating a fire shutter control method according to still another exemplary embodiment of the present invention.

As shown in FIG. 5, in the fire shutter control method according to another exemplary embodiment of the present invention, first, in a fire detection operation S100, the fire detector 100 may detect a fire outbreak and generate a fire signal in the event of a fire.

Then, when the fire signal is generated in the fire detection operation S100, in a fire shutter control operation S200, the fire shutter controller 200 may control the fire shutter 10 to enable the drive motor 100 for operating the fire shutter 10 to operate.

At this time, in the fire shutter control operation S200, control signals may be dually applied to the fire shutter 10 to prevent failure of the operation control of the fire shutter 10.

For example, in the fire shutter control operation S200, the control signals may be dually applied to the fire shutter 10 through a first control operation S210 of applying a first control signal to the fire shutter 10 to operate the fire shutter 10 when the fire signal is generated in the fire detection operation S100 and a second control operation S220 of applying a second control signal to the fire shutter 10 after the lapse of the first time period.

In the fire shutter control operation S200, after applying the above-described dual control signals, a closing completion signal may be applied to the disaster prevention center 120 of the fire detector 100 through a closing completion signal application operation S240.

In addition, in the fire detection operation S100 and the fire shutter control operation S200 described above, the fire detector 100, the fire shutter controller 200, and the drive motor 11 for operating the fire shutter 10 may be supplied power from the power supply unit 300.

At this time, through a dual power supply operation S300, the power supply unit 300 may easily supply power through the emergency power supply source 320 even if the external power is not supplied to the main power supply source 310 during a power failure.

For example, in the dual power supply operation S300, when the fire signal is generated in the fire detection operation S100, whether a power failure occurs is determined in a power failure detection operation S310, when it is determined that a power failure does not occur, main power may be supplied as usual through a main power application operation S320, and when it is determined that a power failure occurs, the emergency power supply source 320 may be operated to supply emergency power through an emergency power application operation S330.

In addition, as shown in FIG. 6, according to the fire shutter control method in accordance with still another exemplary embodiment of the present invention, in the fire shutter control operation S200, the dual control signals are applied through the first control operation S210 and the second control operation S220 described above, and then a feedback signal regarding the completion of descent may be received from the fire shutter 10 through a shutter closing detection operation S230.

Accordingly, in the fire shutter control operation S200, when it is determined that the closing of the fire shutter 10 is completed through a descent completion feedback signal of the shutter closing detection operation S230, a closing completion signal may be applied to the disaster prevention center 120 of the fire detector 100 through a closing completion signal application operation S240.

Subsequently, when the closing completion signal is not applied through the closing completion signal application operation S240 even after the lapse of a second time period through a closing completion signal application check operation S110, as the descent completion signal is not applied through the shutter closing detection operation S230, the disaster prevention center 120 of the fire detector 100 may re-perform at least one of the first control operation S210 or the second control operation S220.

Therefore, according to the fire shutter control method in accordance with various embodiments of the present invention, it is possible to configure a dual power supply system that uses an emergency power source consisting of a charger and a battery in addition to a general power source to supply power in the event of a power failure and to configure a dual signal generation system that dually transmits disaster prevention signals by being dually connected to a PLC and a timer so that a normal operation is enabled even in the event of a PLC failure.

In this way, in normal circumstances, the fire shutter 10 may be operated with a general power system, but in an emergency, such as in the event of a fire or a power failure, the fire shutter 10 may be stably operated by using dually provided emergency power source and disaster prevention signals, so that the fire shutter 10 can be normally operated even in the event of a power failure or damage to some control devices.

Thus, in the event of a fire, even when a power failure or damage to some control devices occurs due to the fire, the fire shutter may be normally operated to prevent fire-produced toxic gases from being transported to all floors and to prevent the fire from spreading through all floors, thereby minimizing damage caused by fire.

According to the exemplary embodiment of the present invention as described above, it is possible to configure a dual power supply system that uses an emergency power source consisting of a charger and a battery in addition to a general power source to supply power in the event of a power failure and to configure a dual signal generation system that dually transmits disaster prevention signals by being dually connected to a PLC and a timer so that a normal operation is enabled even in the event of a PLC failure.

In this way, in normal circumstances, the fire shutter may be operated with a general power system, but in an emergency, such as in the event of a fire or a power failure, the fire shutter may be stably operated by using dually provided emergency power source and disaster prevention signals, so that the fire shutter can be normally operated even in the event of a power failure or damage to some control devices.

Accordingly, a fire shutter control system and a fire shutter control method which can minimize damage caused by fire by normally operating a fire shutter even when a power failure or damage to some control devices occurs in the event of a fire to prevent fire-produced toxic gases from being transported to all floors and to prevent the fire from spreading throughout all floors. However, the scope of the present invention is not limited by the above effect.

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. A fire shutter control system comprising:

a fire detector configured to detect a fire outbreak and generate a fire signal in the event of a fire;

a fire shutter controller configured to apply a control signal to a fire shutter to enable a drive motor for operating the fire shutter to operate when the fire signal is generated by the fire detector; and a power supply unit configured to supply power to the fire detector, the fire shutter controller, and the drive motor for operating the fire shutter, wherein:

the fire shutter controller comprises a dual signal generation system configured to dually apply the control signal to the fire shutter to prevent failure of operation control of the fire shutter, the power supply unit comprises a dual power supply system configured to supply emergency power to the fire detector, the fire shutter controller, and the drive motor for operating the fire shutter when main power is cut off so that the power can be supplied even in the event of a power failure, the fire shutter controller comprises: a programmable logic controller (PLC) configured to apply a first control signal to the fire shutter when the fire signal is generated by the fire detector; a timer configured to apply a second control signal to the fire shutter after the lapse of a first time period when the fire signal is generated by the fire detector, and a relay configured to receive the first control signal from the PLC or the second control signal from the timer and transmit a close signal to the fire shutter, and the fire shutter controller is configured as a dual signal generation system which is dually connected to the PLC and the timer and transmits dual disaster prevention signals to operate the fire shutter, by applying the first control signal to the fire shutter from the PLC through the relay to enable the drive motor and applying the second control signal to the fire shutter from the timer through the relay after the lapse of a first time period, when the fire signal is generated by the fire detector.

2. The fire shutter control system of claim 1, wherein the fire detector comprises: a fire signal generator electrically connected to at least one of a smoke sensor for detecting an occurrence of smoke in a specific area or a heat sensor for detecting flames and configured to generate the fire signal related to the smoke or heat in the event of a fire; and a disaster prevention center configured to transmit the fire signal to the fire shutter controller corresponding to the specific area when the fire signal is generated by the fire signal generator.

3. The fire shutter control system of claim 1, wherein the fire shutter controller further comprises a limit sensor installed on one side of a slat of the fire shutter to sense completion of descent of the slat.

4. The fire shutter control system of claim 3, wherein the limit sensor applies a descent completion signal to the PLC when sensing the completion of the descent of the slat and the PLC determines that closing of the fire shutter is completed when receiving the descent completion signal from the limit sensor and transmit a closing completion signal to the disaster prevention center of the fire detector.

5. The fire shutter control system of claim 4, wherein the disaster prevention center transmits again the fire signal to the fire shutter controller corresponding to the specific area if the closing completion signal is not applied from the PLC even after the lapse of a second time period.

6. The fire shutter control system of claim 1, wherein the power supply unit comprises: a main power supply source configured to receive external power from an external power source and supply the main power to the fire detector, the fire shutter controller, and the drive motor for operating the fire shutter; and an emergency power supply source electrically connected to the main power supply source and configured to receive at least a portion of the main power from the main power supply source, store emergency electric power, and supply the stored electric power as the emergency power to the fire detector, the fire shutter controller, and the drive motor for operating the fire shutter when the external power is cut off.

7. The fire shutter control system of claim 6, wherein the emergency power supply source comprises: a battery configured to store the emergency electric power; and a charger configured to receive at least a portion of the main power from a switched-mode power supply (SMPS) of the main power supply source and charge the battery.

8. The fire shutter control system of claim 7, wherein the main power supply source comprises a first voltmeter configured to measure a voltage of the main power, the emergency power supply source comprises a second voltmeter, and when the voltage of the main power measured by the first voltmeter is measured to be less than or equal to a predetermined voltage, the power supply unit determines that the external power is cut off, and disconnects between a terminal block and the main power supply source by turning off a first magnetic contactor (MC) of the main power supply source and connects between the terminal block and the emergency power supply source by turning on a second magnetic contactor of the emergency power supply source so that the emergency electric power stored in the battery can be supplied as the emergency power.

9. The fire shutter control system of claim 1, further comprising a terminal block configured to electrically connect the power supply unit, the fire detector, the fire shutter controller, and the drive motor for operating the fire shutter.

10. The fire shutter control system of claim 1, further comprising a monitor unit electrically connected to the fire detector and configured to display a fire situation, and a state of operating the fire shutter by the fire shutter controller.

11. A fire shutter control method comprising:

a fire detection operation of detecting, by a fire detector, a fire outbreak and generating a fire signal in the event of a fire; and a fire shutter control operation of controlling a fire shutter by a fire shutter controller to enable a drive motor for operating the fire shutter to operate when the fire signal is generated in the fire detection operation, wherein in the fire shutter control operation, the control signal is dually applied to the fire shutter to prevent failure of operation control of the fire shutter, wherein the fire shutter controller comprises: a programmable logic controller (PLC) configured to apply a first control signal to the fire shutter when the fire signal is generated by the fire detector; a timer configured to apply a second control signal to the fire shutter after the lapse of a first time period when the fire signal is generated by the fire detector, and a relay configured to receive the first control signal from the PLC or the second control signal from the timer and transmit a close signal to the fire shutter, and wherein the fire shutter control operation comprises: a first control operation of applying the first control signal to the fire shutter from the PLC through the relay to operate the fire shutter; and a second control operation of applying a second control signal to the fire shutter from the timer through the relay when the first time period elapses after performing the first control operation.

12. The fire shutter control method of claim 11, wherein the fire shutter control operation comprises a shutter closing detection operation of detecting a descent completion of a slat of the fire shutter through a limit sensor installed on one side of the slat.

13. The fire shutter control method of claim 12, wherein in the shutter closing detection operation of the fire shutter control operation, when a descent completion signal is applied, it is determined that closing of the fire shutter is completed and a closing completion signal is transmitted to a disaster prevention center of the fire detector.

14. The fire shutter control method of claim 13, wherein in the fire shutter control operation, if the descent completion signal is not applied through the shutter closing detection operation even after the lapse of a second time period, at least one of the first control operation or the second control operation is re-performed.

15. The fire shutter control method of claim 11, wherein in the fire detection operation and the fire shutter control operation, the fire detector, the fire shutter controller, and the drive motor for operating the fire shutter is supplied with power from a power supply unit and the power supply unit comprises a dual power supply system configured to supply emergency power to the fire detector, the fire shutter controller, and the drive motor for operating the fire shutter when main power is cut off, so that the power can be supplied in the event of a power failure.

16. A fire shutter control system comprising:

a fire detector configured to detect a fire outbreak and generate a fire signal in the event of a fire;

a fire shutter controller configured to apply a control signal to a fire shutter to enable a drive motor for operating the fire shutter to operate when the fire signal is generated by the fire detector and comprising a dual signal generation system configured to dually apply the control signal to the fire shutter to prevent failure of control operation of the fire shutter; and a power supply unit configured to supply power to the fire detector, the fire shutter controller, and the drive motor for operating the fire shutter and comprising a dual power supply system configured to supply emergency power to the fire detector, the fire shutter controller, and the drive motor for operating the fire shutter when main power is cut off, so that the power can be supplied in the event of a power failure, wherein:

the fire detector comprises:

a fire signal generator electrically connected to at least one of a smoke sensor for detecting an occurrence of smoke in a specific area or a heat sensor for detecting flames and configured to generate the fire signal related to the smoke or heat in the event of a fire; and a disaster prevention center configured to transmit the fire signal to the fire shutter controller corresponding to the specific area when the fire signal is generated by the fire signal generator, the fire shutter controller comprises:

a programmable logic controller (PLC) configured to apply a first control signal to the fire shutter;

a timer configured to apply a second control signal to the fire shutter after the lapse of a first time period, and a relay configured to receive the first control signal from the PLC or the second control signal from the timer and transmit a close signal to the fire shutter, the power supply unit comprises:

a main power supply source configured to receive external power from an external power source and supply the main power to the fire detector, the fire shutter controller, and the drive motor for operating the fire shutter; and an emergency power supply source electrically connected to the main power supply source and configured to receive at least a portion of the main power from the main power supply source, store emergency electric power, and supply the stored electric power as the emergency power to the fire detector, the fire shutter controller, and the drive motor for operating the fire shutter when the external power is cut off, and wherein the fire shutter controller is configured as a dual signal generation system which is dually connected to the PLC and the timer and transmits dual disaster prevention signals to operate the fire shutter, by applying the first control signal to the fire shutter from the PLC through the relay to enable the drive motor and applying the second control signal to the fire shutter from the timer through the relay after the lapse of a first time period, when the fire signal is generated by the fire detector.

* * * * *